United States Patent
Vischer, Jr.

[11] 3,736,860
[45] June 5, 1973

[54] INFRARED COOKING APPARATUS
[75] Inventor: Alfred Vischer, Jr., Tucson, Ariz.
[73] Assignee: Vischer Products Company, Chicago, Ill.
[22] Filed: Apr. 6, 1971
[21] Appl. No.: 131,734

[52] U.S. Cl. ................. 99/339, 99/443 C, 219/388
[51] Int. Cl. ................................................ A47j 37/04
[58] Field of Search .................... 99/339, 331, 332, 99/340, 386, 423, 443; 107/55; 219/354, 388, 401, 411, 553

[56] References Cited

UNITED STATES PATENTS

| | | | |
|---|---|---|---|
| 3,528,362 | 9/1970 | Arnold, Jr. | 99/443 C X |
| 1,169,023 | 1/1916 | Embrey | 107/55 A UX |
| 2,028,748 | 1/1936 | Houlis | 107/55 A X |
| 3,355,573 | 11/1967 | Wilson | 99/339 X |
| 2,454,370 | 11/1948 | Beaubien | 107/55 R X |
| 3,524,403 | 8/1970 | Treloar | 99/339 X |

FOREIGN PATENTS OR APPLICATIONS

| | | | |
|---|---|---|---|
| 807,949 | 1/1959 | Great Britain | 107/55 A |
| 176,179 | 9/1953 | Austria | 107/55 A |

*Primary Examiner*—William I. Price
*Assistant Examiner*—Arthur O. Henderson
*Attorney*—Lawrence B. Biebel, Nathaniel R. French, Dailey L. Bugg, Joseph G. Nauman, Gilbert N. Henderson, Mario A. Martella, Edward P. Forgrave and Thomas W. Flynn

[57] ABSTRACT

The cooking method involves the simultaneous application of infrared radiation to a food product and the spraying of steam onto the food product to provide improved heat penetration into the product and to minimize the loss of juices and moisture from the product. The cooking apparatus includes infrared radiating elements disposed in a cooking chamber above and below a perforate support for the food product and a plurality of steam spray tubes interposed between the food product and the source of radiation, the food product support being a motor driven conveyor belt for carrying the food into, through and out of the cooking chamber.

5 Claims, 4 Drawing Figures

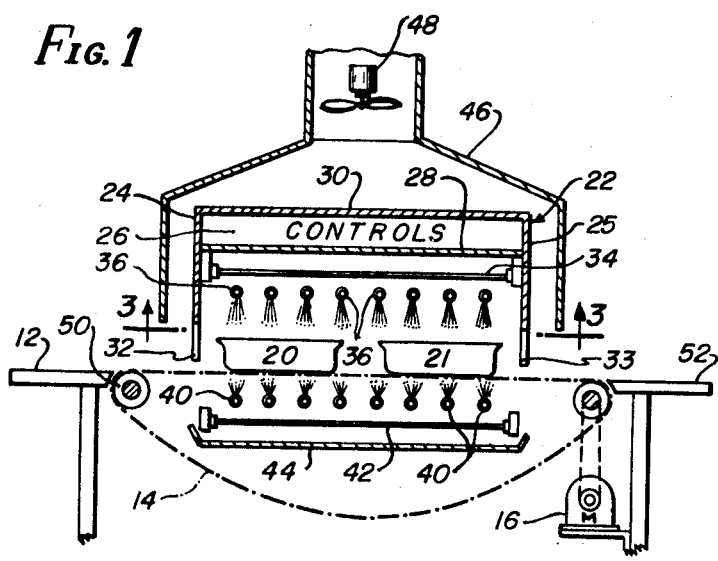
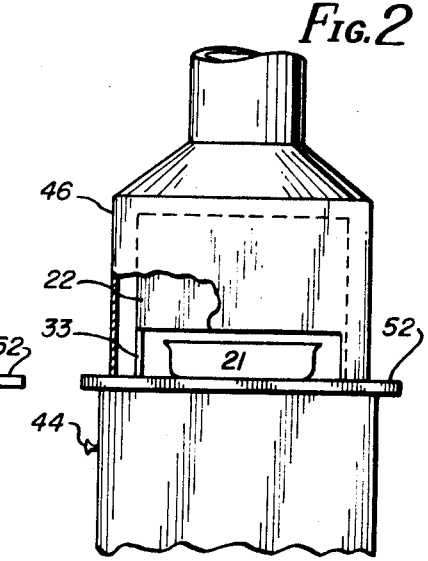
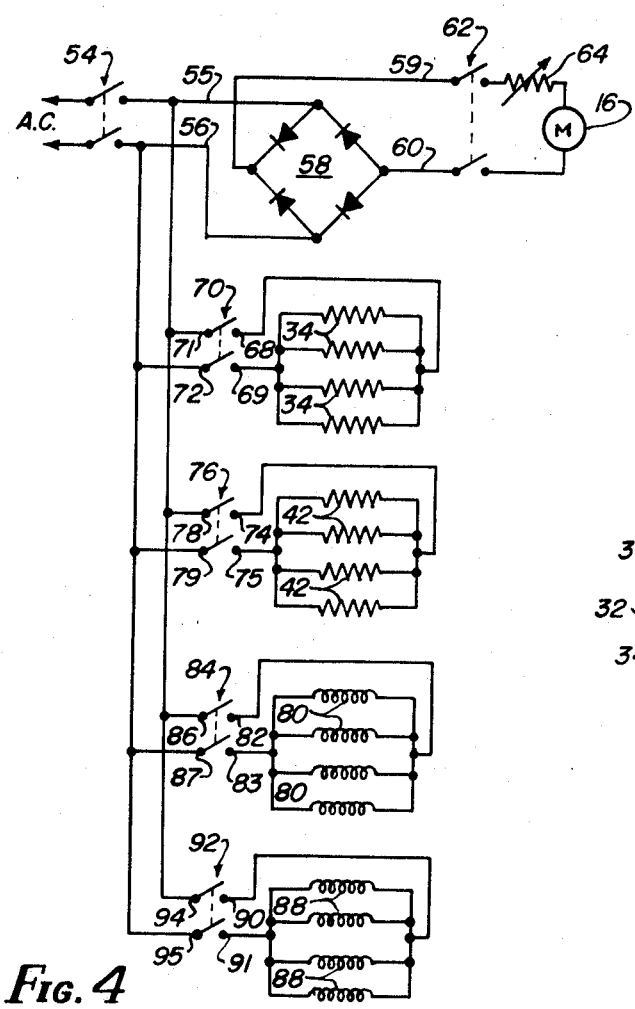
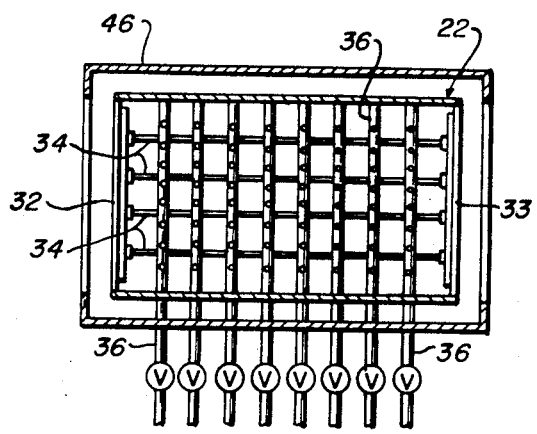
INVENTOR
Alfred Vischer, Jr.
BY
ATTYS.

INFRARED COOKING APPARATUS

The present invention generally relates to the cooking of food products, and it relates more particularly to a new and improved cooking apparatus wherein heat is conveyed to the food product by radiation from an infrared source and by high velocity jets of steam which are sprayed directly onto the food product simultaneously with the irradiating of the food from the infrared source.

In the past, heat has been applied to a food product by irradiating the food with infrared rays emanating from an infrared radiation source.

One such disadvantage is that the moisture and juices are removed from the food product making it relatively dry and sometimes tasteless. Another disadvantage of this type of cooking is that the outer surfaces of the food are cooked to a substantially greater degree than are the inner surfaces. Another form of cooking utilizes steam for transferring heat to the food product. This latter type of cooking is sometimes carried out in a pressurized system and at other times the cooking chamber is maintained at approximately atmospheric pressure. This type of cooking has certain advantages for different types of food, such, for example, as in the cooking of frozen vegetables. However, when this system is used for cooking meat products the cooked food product has an appearance quite different from that to which the public has become accustomed.

It would be desirable, therefore, to provide an apparatus wherein the advantages of the two types of heating are retained and the disadvantages of each are eliminated whereby the food product could be completely cooked without overcooking the outer portions while providing a food product having the appearance normally associated with conventional baking or broiling wherein relatively dry heat is applied to the food product.

An object therefore of the present invention is to provide a new and improved apparatus for cooking, employing the simultaneous application of infrared radiation and steam to the food product.

Another object of the present invention is to provide and apparatus for cooking wherein the steam is applied to the food by high velocity jets of dry steam.

A further object of the present invention is to provide a new and improved cooking apparatus employing a source of infrared radiation and means for applying jets of steam onto the food product, such means being interposed between the source of radiation and the food to minimize the splatter of the food juices onto the infrared source.

A still further object of the present invention is to provide such a cooking apparatus wherein the dual heating means are disposed above and below the food product which is carried by a motor driven conveyor through the cooking area.

Further objects and advantages and a better understanding of the present invention may be had by reference to the following detailed description taken in connection with the accompanying drawing wherein:

FIG. 1 is a somewhat schematic cross-sectional elevational view of a cooking apparatus embodying the present invention;

FIG. 2 is an end view of the cooking apparatus of FIG. 1;

FIG. 3 is a sectional view taken along the line 3—3 of FIG. 1 assuming the entire device to be shown therein; and FIG. 4 is an electric circuit diagram of the cooking apparatus of FIG. 1.

Referring now to FIG. 1, there is shown a cooking apparatus 10 including a loading platform 12, a conveyor chain 14 driven by an electric motor 16 for carrying a food product through a cooking chamber 18 disposed above and below the portion of the conveyor belt 14 which extends therethrough. For illustration purposes, the food product is carried by a pair of shallow pans or trays 20 and 21 supported on the conveyor belt 14. The trays are shown positioned in the cooking chamber 18.

A housing 22 includes end walls 24 and 25, side walls 26 and 27, and a partition 28 as well as a removable cover portion 30 at the top. The electric control for the oven may be conveniently located and mounted on the upper surface of the partition 28 which is sealably connected along its four edges to the adjacent portions of the housing 22.

The end walls 24 and 25 are provided with rectangularly shaped openings 32 and 33 at the bottom, the opening 33 being best shown in FIG. 2. These openings are to provide passageways to permit entry and exit of the food product into the cooking chamber 18 and also to provide exit ports for the steam which is released within the chamber 18 as described hereinafter. A source of infrared radiation in the form of a plurality of infrared elements 34 is mounted within the housing 22 between the end walls 24 and 25 thereof a short distance below the partiion 28 and when energized emit radiation within the infrared band for application to the food product supported within the cooking chamber 18 on the conveyor 14. Mounted below the elements 34 is a source of high velocity steam in the form of a plurality of spray tubes 36 which are mounted between the side walls 26 and 27 and extend transversely to the infrared elements 34. The spray tubes 36 are supplied with steam from a suitable steam source and the steam is preferably dry and at a temperature of approximately 250°. These spray tubes 36 are each provided with a plurality of spaced apart orifices along the bottoms thereof to emit jets of steam 38 which are applied directly to the food product thereby penetrating such product and carrying heat to the inner portions thereof. These steam sprays 38 also serve to minimize if not prevent the deposit of the food juices onto the infrared elements 34. If desired, the spray tubes 36 may also be provided with a few orifices in the top surface to spray the infrared elements 34 and thereby maintain them in a clean maximum radiating condition.

Mounted below the conveyor belt 14, is a second set of steam spray tubes 40 which direct steam against the bottom of the food product or against the bottom of a container such as the trays 20 and 21 if such containers are used, it being understood that the food product may be placed directly on the conveyor belt 14 as, for example, in the cooking of hamburgers. Mounted below the spray tubes 40 is a plurality of heating elements 42 which may be calrod units or quartz rods such as the elements 34. If desired, the spray tubes 40 may also be provided with a few orifices along the bottom surfaces thereof to spray steam directly onto the elements 42 to maintain them in a clean, maximum radiating condition. Disposed below the lower heating elements 42 is a tray 44 having an imperforate surface to collect juices, liquids and any other particles which may drop from the conveyor 14.

In order to maintain the area around the cooker relatively free from vapor, odors and the like, an exhaust hood 46 is mounted over the housing 22 and includes a blower 48 which blows in an upward direction and thereby moves air and any entrained particles, vapor and the like out through the openings 32 and 33 from the cooking chamber 18 and through the passages at the front and rear end of the cooker and out to a suitable exhaust duct. Consequently, when a food product which emits grease or other flammable material is being cooked, such flammable particles are kept away from the heating elements 34 and 42 and, in addition, the continuous application of steam to the cooking chamber 18 maintains that chamber substantially free from oxygen whereby there is no chance of a fire occurring in the cooking chamber 18.

Before considering the electric circuit diagram associated with a preferred embodiment of the present invention, it is deemed advisable to consider the various ways in which the cooker 10 and the method of cooking may be employed. Where, for example, the food product is one which is to be cooked on a more or less continuous basis such as the cooking of hamburgers at a hamburger drive-in type restaurant, the motor 16 is driven continuously and the heating elements 34 are continuously energized. Moreover, where solenoid control valves are provided for the spray tubes 36 and 40 to connect them to the suitable source of steam, such valves remain open at all times. Consequently, the raw hamburgers which may be stacked on the loading platform 12 are placed by the operator onto the adjacent end of the belt 14 on top of the idler roll 50 and are transported by the conveyor 14 through the doorway 32 into the chamber 18. As the conveyor 14 moves, the hamburgers are carried through the chamber 18 and eventually pass out of the chamber through the exit doorway 33 and pass onto an unloading platform 52 or, if desired, the operator may lift them with a suitable spatula or the like from the conveyor 14.

Where the cooker 10 is to be used for cooking or processing other types of food such, for example, as stew, the uncooked mixture is placed in a container 20 which in that case would have an imperforate bottom and the motor may then be momentarily energized to move the pan into the chamber 18. As shown, the chamber 18 may be sufficiently long to permit the presence of more than one such pan therein at a given time. With the pan in place, the heating elements 34 are energized and the control valves for the spray tubes 36 and 40 are also energized thereby to apply heat to the product being cooked. After a sufficient time for the food to be cooked, the motor 16 is again energized and the tray 20 passes out of the cooking chamber 18 through the exit doorway 33 and onto the unloading platform 52.

In some cases it is desirable that the outer surface of the food product be relatively dry and have a somewhat crusty characteristic. When cooking this type of food, the heating elements 34, 42 and the spray tubes 36 and 40 are operated in a manner hereinbefore described to cook the food. However, just prior to operation of the motor 16 to move the food out of chamber 18, the control valves for the spray tubes 36 and 40 are closed whereby the only heat transmitted to the food product is that which is radiated from the heating elements 34 and 42. Consequently, this dry heat dries out the outer surface of the product and by controlling the time during which the food product remains in the cooking chamber in the absence of steam the desired degree of crust may be provided. Once this has been accomplished, the motor 16 is again energized to move the food out of the chamber 18 where the operator may transfer it to serving plates or the like.

Referring to FIG. 4, a source of two-phase AC voltage is adapted to be connected to a double-pole, double-through switch 54 which is in turn connected to a pair of conductors 55 and 56 across a full-wave rectifier 58, the output of which is connected via a pair of conductors 59 and 60 to a double-pole, double-throw switch 62, the output terminals of which are connected through a variable resistor 64 across the terminals of the DC motor 16. Accordingly, with the main line switch closed and the motor control switch 62 closed, the resistor 64 can be used to adjust the speed of the motor 16.

The heating elements 34, which are preferably quartz rods are connected in parallel between the terminals 68 and 69 of a double-pole, double-throw switch 70 whose other terminals 71 and 72 are respectively connected to the power conductors 55 and 56. Similarly, the heating elements 42, which may be quartz rods or calrod units are connected in parallel between the terminals 74 and 75 of a double-pole, double-throw switch 76 whose other terminals 78 and 79 are respectively connected to the power conductors 55 and 56.

As indicated hereinbefore, each of the upper steam spray tubes 36 is connected through a solenoid valve to a source of steam and in FIG. 4 the solenoids are indicated at 80 and are connected in parallel between the terminals 82 and 83 of a double-pole, double-throw switch 84, the other terminals 86 and 87 of which are connected respectively to the power line conductors 55 and 56. In like manner, solenoids 88 of the control valves for the lower steam spray tubes 40 are connected in parallel between the terminals 90 and 91 of the double-pole, double-throw switch 92, the other terminals of which 94 and 95 are respectively connected to the power lines 55 and 56. If desired, switches may be connected in series with each of the heating elements 34 and 42 and with each of the solenoids 80 and 88, thereby enabling the operator to select the amount of heat being radiated within the chamber 18 as well as the distribution of such heat and also the amount and distribution of steam which is being provided therein.

If desired, when operating the oven 10, the switch 62 may be opened to hold the food in the chamber for some predetermined time. It will be understood, of course, that a timer or the like may be used for controlling the switch 62 if that be desired.

While the present invention has been described in connection with particular embodiments thereof it will be understood that those skilled in the art may make many changes and modifications without departing from the true spirit and scope of the invention. Therefore, by the appended claims it is intended to cover all such changes and modifications as come within the true spirit and scope of this invention.

What is claimed is:

1. Cooking apparatus comprising
   means defining a cooking chamber,
   a perforate conveyor for carrying a food product through said cooking chamber,
   a motor for driving said conveyor, first and second sources of infrared radiation respectively disposed above and below said conveyor, a plurality of steam tubes disposed above and below said conveyor, and a plurality of orifices in said tubes for directing steam toward said conveyor.

2. Cooking apparatus comprising means defining a cooking chamber, means for supporting a food product in said chamber, means for irradiating said food product with infrared radiation including at least one quartz rod, and means disposed between said quartz rod and said product support for spraying steam on said food while it is being irradiated with said infrared radiation, whereby said steam spray minimizes splatter of juices from said food product onto said quartz rod.

3. Cooking apparatus comprising means defining a cooking chamber, means for supporting a food product in said chamber, means for irradiating said food product with infrared radiation, and means for spraying steam onto said food while it is being irradiated with said infrared radiation, said spraying means including orifices facing toward said source of infrared radiation for spraying steam onto said source.

4. Cooking apparatus comprising means defining a cooking chamber, means for supporting a food product in said chamber, means disposed throughout said cooking chamber for irradiating a food product therein with infrared radiation, and means for spraying steam on a food product disposed throughout said cooking chamber substantially coextensively with said irradiating means to allow a food product to be simultaneously irradiated and steamed at substantially all points within said cooking chamber.

5. The cooking apparatus of claim 1 wherein said spraying is disposed between said irradiating means and said food supporting means.

* * * * *